Nov. 18, 1941.    J. B. ARMITAGE ET AL    2,263,404
BORING AND MILLING MACHINE
Filed April 15, 1939    9 Sheets-Sheet 1
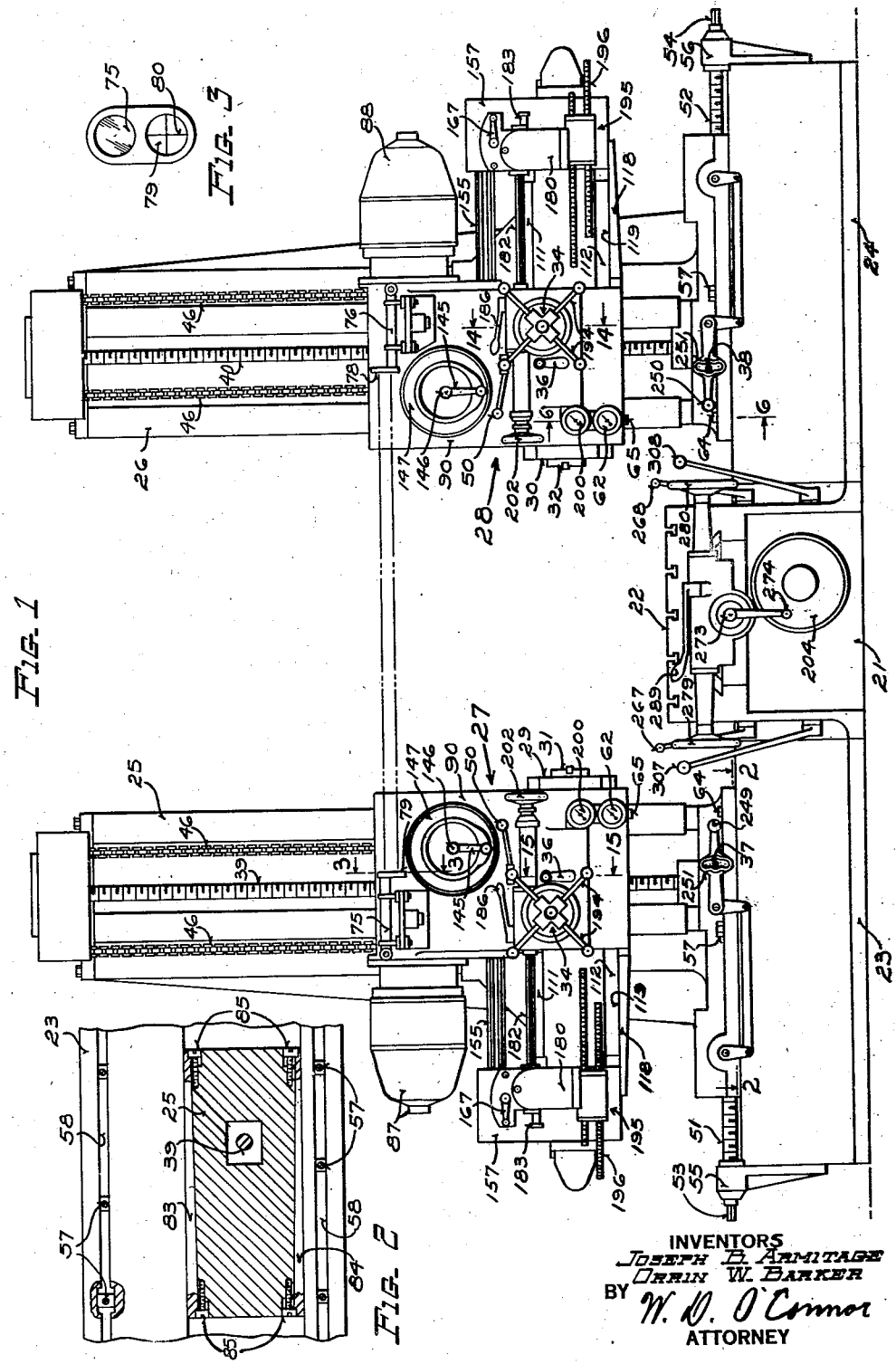
INVENTORS
JOSEPH B. ARMITAGE
ORRIN W. BARKER
BY W. D. O'Connor
ATTORNEY

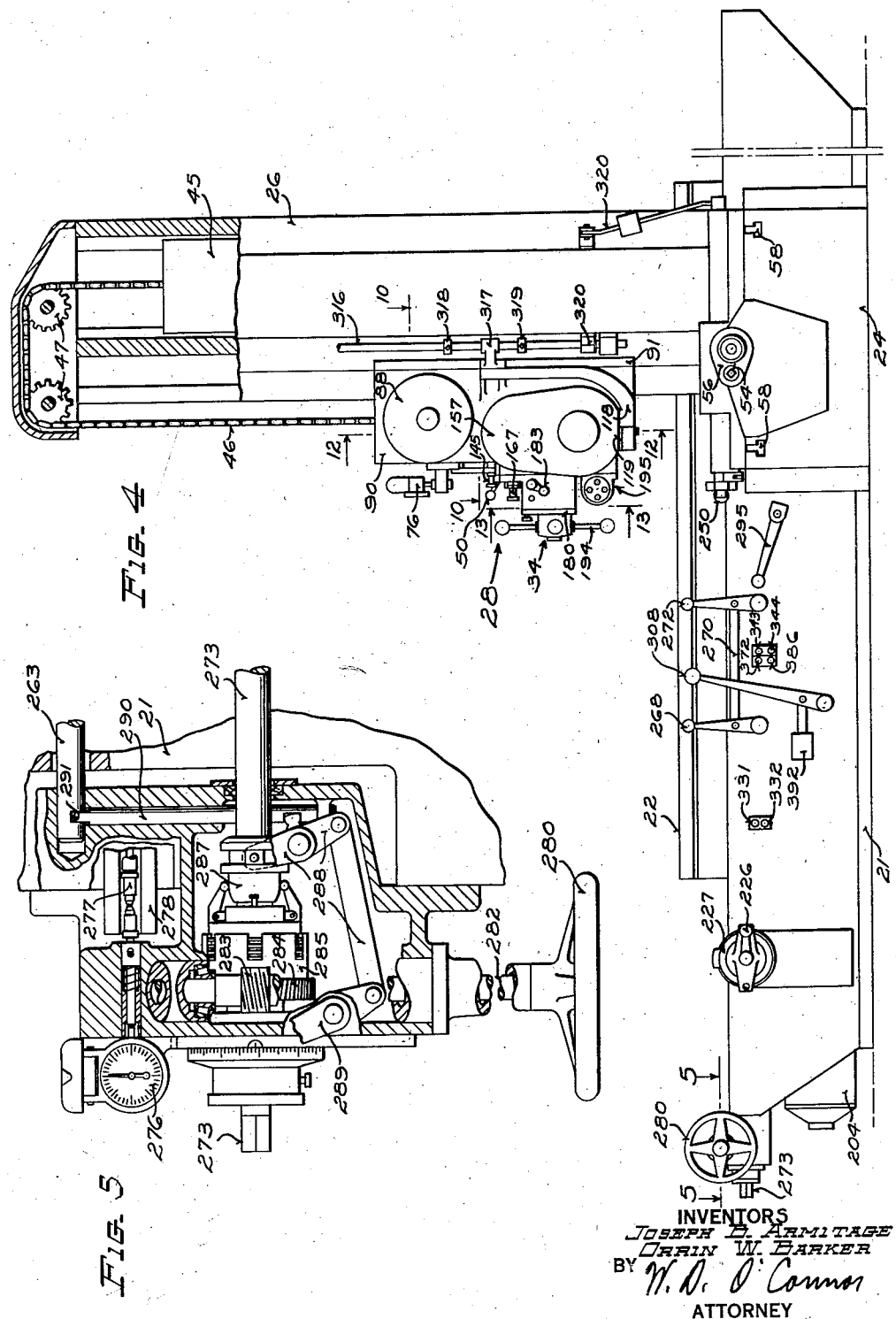

Nov. 18, 1941. J. B. ARMITAGE ET AL 2,263,404
BORING AND MILLING MACHINE
Filed April 15, 1939 9 Sheets-Sheet 3
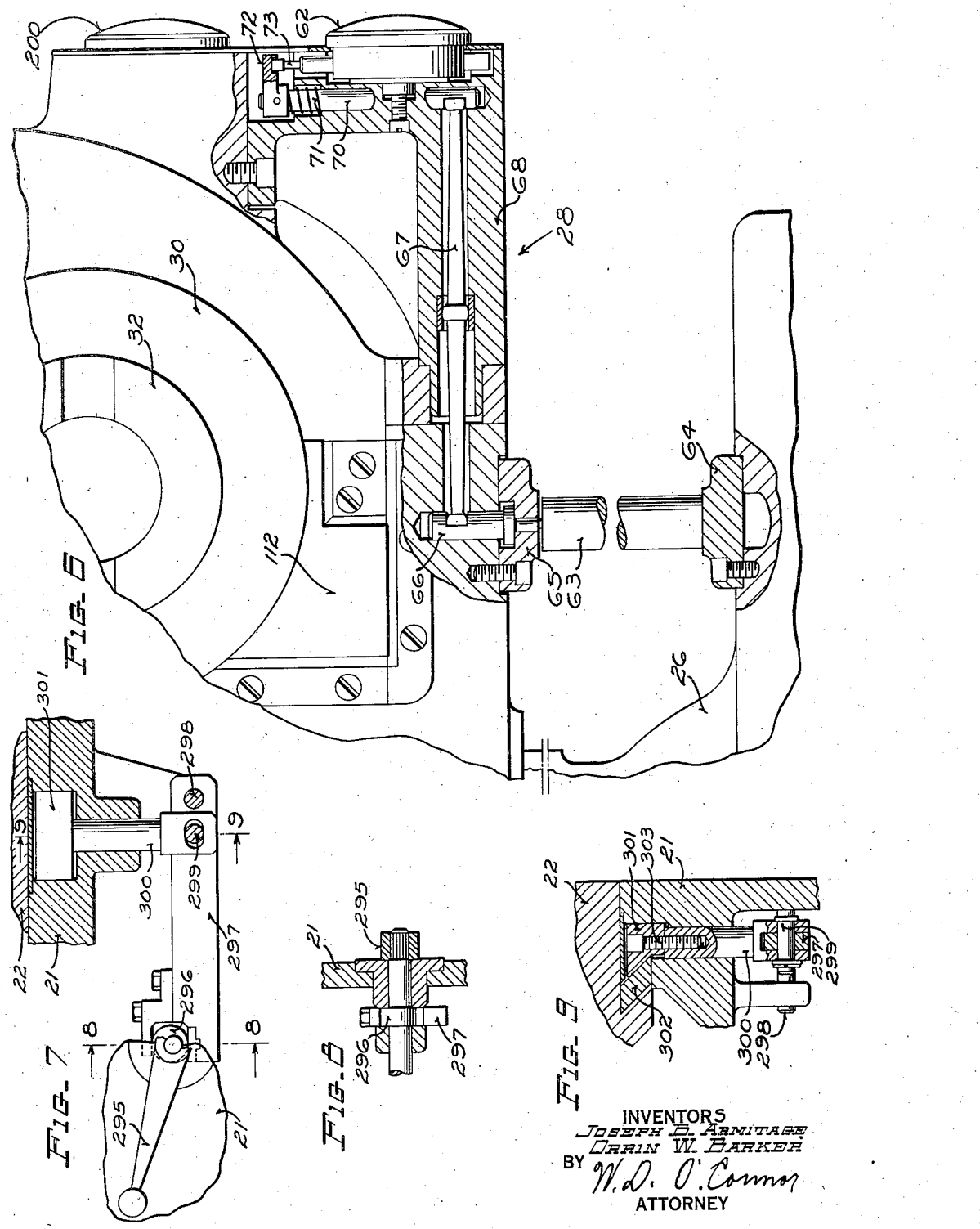
INVENTORS
JOSEPH B. ARMITAGE
ORRIN W. BARKER
BY W. D. O'Connor
ATTORNEY

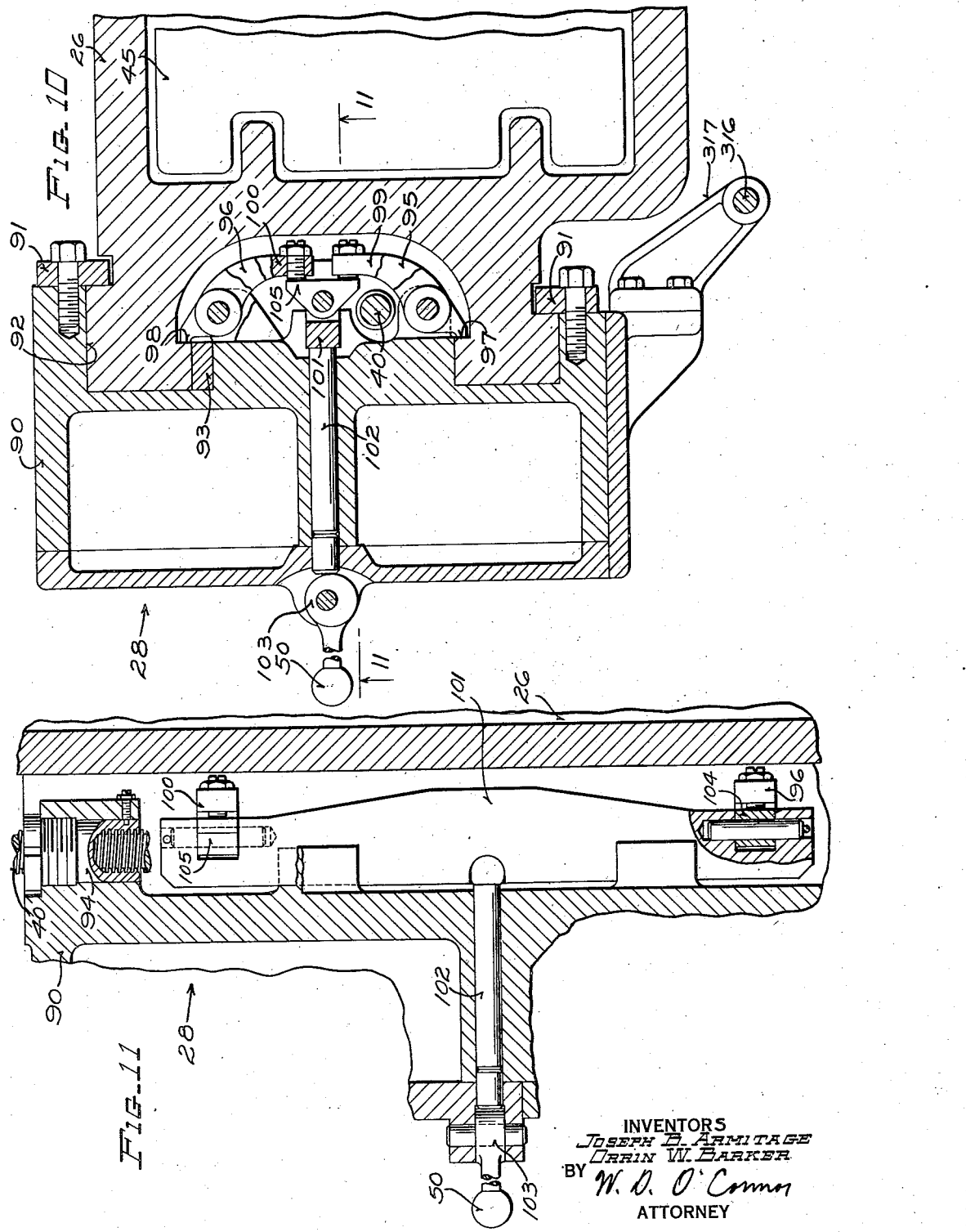

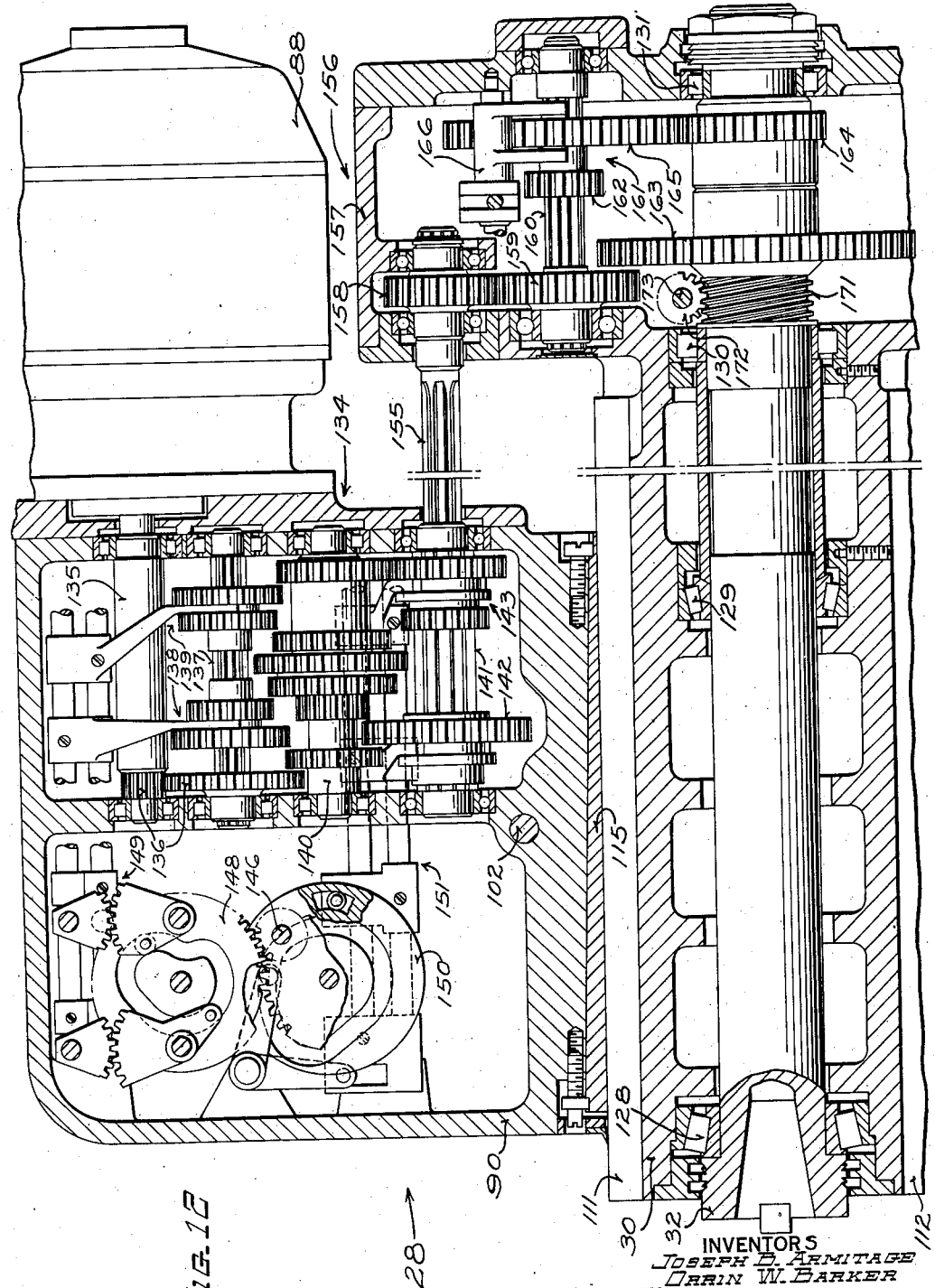

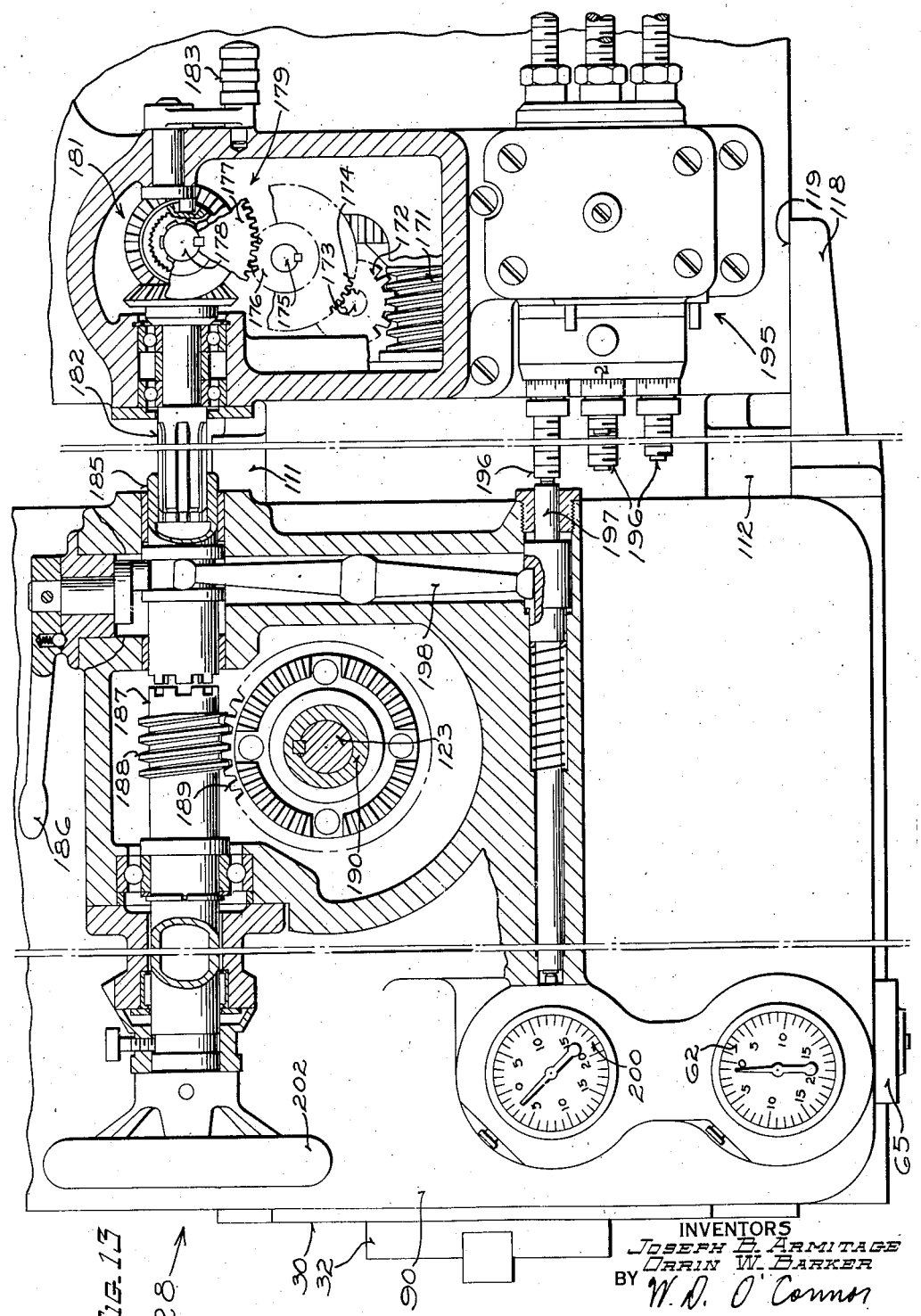

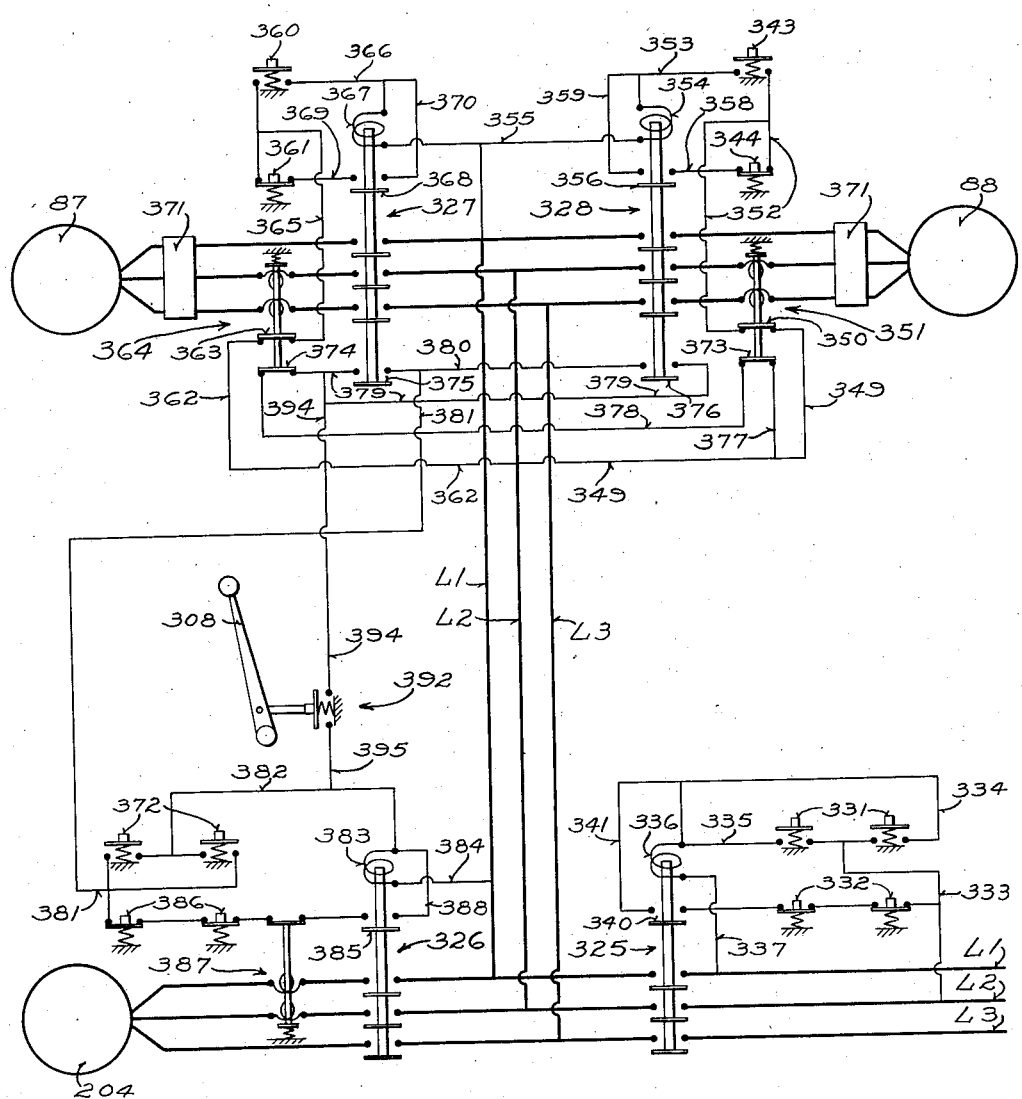

Patented Nov. 18, 1941

2,263,404

UNITED STATES PATENT OFFICE 2,263,404

BORING AND MILLING MACHINE

Joseph B. Armitage, Wauwatosa, and Orrin W. Barker, Milwaukee, Wis., assignors to Kearney & Trecker Corporation, West Allis, Wis., a corporation of Wisconsin Application April 15, 1939, Serial No. 268,030

30 Claims. (Cl. 29—26)

This invention relates generally to improvements in machine tools, and more particularly to an improved boring and milling machine.

A general object of the invention is to provide an improved boring and milling machine arranged for convenient and efficient operation in performing work with a high degree of accuracy.

Another object of the invention is to provide a boring and milling machine presenting opposed tool carrying spindles at opposite sides of a work-supporting structure and having improved means for relatively positioning the spindles and the work-support and for correlating their cooperative action.

Another object of the invention is to provide an improved supporting structure for the operating elements of a machine tool.

Another object is to provide an improved power transmission mechanism for actuating the movable elements of a machine tool.

Another object is to provide an improved spindle carrying structure for a boring and milling machine.

Another object is to provide improved means for clamping a spindle carrying head in predetermined position upon a supporting structure.

Another object is to provide an improved tool carrying headstock for a machine tool.

Another object is to provide an improved tool spindle supporting element or ram arranged to provide for bodily axial movement of the spindle.

Another object is to provide improved means for clamping a spindle carrying ram in predetermined position on a machine tool.

Another object is to provide improved driving and feeding mechanism for a machine tool spindle.

Another object is to provide an improved transmission train for effecting feeding movement of a spindle supporting ram.

Another object is to provide an improved spindle supporting ram mounted for bodily movement in axial direction and carrying range changing mechanism connected to drive the spindle and rate changing mechanism connected to effect axial feeding movement of the ram and the spindle.

Another object is to provide an improved spindle carrying ram having rate changing and reversing mechanism connected to be driven by the spindle and operative to effect feeding movement of the ram at a selected rate in a selected direction.

Another object is to provide an improved arrangement for insuring accurate alignment of a tool spindle carrying ram.

Another object is to provide improved means for adjusting the position of a boring machine column in effecting alignment of a spindle carried thereby.

Another object is to provide improved clamping means for a movable element of a machine tool.

Another object is to provide an improved electrical control system for a machine tool.

Another object is to provide a control system for a machine tool having a work-supporting table and a plurality of tool supporting spindles, the arrangement being such that movement of the work table is discontinued whenever any one of the tool spindles becomes overloaded.

Another object is to provide a control system for a machine tool having a feeding motor and a plurality of spindle driving motors so arranged that the feeding motor will be stopped upon the occurrence of an overload condition in any one of the motors.

A further object is to provide an electrical control system for a machine tool having a work moving motor and a plurality of spindle driving motors so arranged that the work moving motor is free to drive the work-support at rapid traverse rate regardless of whether or not the spindle motors are operating but is prevented from driving the work-support at feed rate unless at least one of the spindle motors is operating.

A still further object is to provide an electrical control system for a machine tool having a plurality of spindle motors and a feeding motor, which includes an interlocking contactor and an overload relay associated with each spindle motor, the interlocking contactors being connected in parallel relationship in the feed motor circuit and the overload relays being connected in series relationship in the feed motor circuit, the arrangement being such that the feed motor may be operated when any one of the spindle motors is operating and will be stopped upon the occurrence of an overload condition in any one of the spindle motors.

According to this invention, an improved boring and milling machine having a base carrying a work-supporting table and having two spindle supporting columns upstanding at opposite sides of the table, is provided with improved means for effecting accurate positioning of the work table relative to the tool spindles on the columns, and for correlating the cooperative action therebetween. The tool spindles are disposed in opposed relationship and are mounted on the columns in vertically movable self-contained spindle carrying heads. Improved means are provided for establishing accurate alignment of the opposed spindles, each head being provided with a telescope arranged to be sighted upon a target fixed on the opposing head, the arrangement being such that when the spindles are in accurate alignment the reticle of each telescope will register with its cooperating target. Each spindle is rotatably mounted in an improved ram or spindle carrier slidably supported for bodily axial movement in the spindle head upon angularly disposed plane bearing surfaces. Adjustable gibs are provided for retaining the ram in engagement with the bearing surfaces in the head and a clamping device is arranged to force the complementary bearing surfaces into clamping engagement for clamping the ram rigidly without disturbing the alignment of the spindle. Each spindle is driven by an independent motor carried by the spindle head and operatively connected by speed changing mechanisms to turn the spindle at a selected speed and to feed the ram at a selected rate. The axial feeding movement of the ram is effected by means actuated directly from the spindle, the feeding rate being directly related to the spindle speed, whereby spiral boring operations may be performed at predetermined leads and at cutting speeds determined by the spindle speed changing mechanism. A separate feed driving motor is provided for effecting horizontal feeding movement of the table and vertical feeding movement of the heads, the feed motor being interlocked electrically with the spindle motors in such manner that when the feed drive is engaged it is necessary that one of the spindle motors be operating in order to operate the feed motor, while with the rapid traverse drive engaged the feed motor may be operated regardless of whether or not the spindle motors are operating. Each motor is provided with an overload protective device and the control system is so interlocked that upon the occurrence of an overload condition in either spindle motor the feed motor will be stopped automatically thereby preventing feeding movement of a workpiece against a stationary cutter. Improved selectively connectable manually actuated means are provided for moving the table, the heads and the rams in precisely positioning them, and improved clamping means function to retain them rigidly in their adjusted positions.

The invention is exemplified herein by means of a combined boring and milling machine embodying the inventive features; however it is to be understood that this particular embodiment is intended to be illustrative only and that various other structures, all within the range of equivalents of the features defined in the subjoined claims, may be utilized in practicing this invention.

The foregoing and other objects of the invention, which will become more fully apparent as the following detailed specification proceeds, may be achieved by means of the exemplifying apparatus depicted in and described in connection with the accompanying drawings, in which:

Figure 1 is a general view in end elevation of a boring and milling machine illustrating the type of apparatus in which the present invention may be incorporated to advantage;

Fig. 2 is a fragmentary detailed view, taken in horizontal section on the plane represented by the line 2—2 in Fig. 1, and showing the arrangement for adjustably positioning a column of the machine on its base;

Fig. 3 is an enlarged end view of one of the telescopes and targets shown in Figs. 1 and 4 and used for aligning the spindles of the machine, taken generally on the plane represented by the line 3—3 in Fig. 1;

Fig. 4 is another general view of the boring and milling machine taken in side elevation, the upper part of one column having been broken away to show the spindle head counterweight;

Fig. 5 is an enlarged fragmentary view of the manually actuated mechanism for adjusting the work table, taken generally in horizontal section on the plane represented by the line 5—5 in Fig. 4;

Fig. 6 is an enlarged fragmentary view of the indicating apparatus for vertically positioning the spindle supporting heads, taken partly in vertical section on the plane represented by the line 6—6 in Fig. 1;

Fig. 7 is a fragmentary view, partly in vertical section, of the table clamping mechanism and its actuating lever, the lever being mounted on the side of the machine base as shown in Fig. 4;

Fig. 8 is a fragmentary detailed view of the table clamping mechanism, taken on the plane represented by the line 8—8 in Fig. 7;

Fig. 9 is another fragmentary detailed view of the table clamping mechanism, taken on the plane represented by the line 9—9 in Fig. 7;

Fig. 10 is a view in horizontal section of part of the right supporting column and the associated spindle head, taken approximately on the planes represented by the line 10—10 in Fig. 4 and showing the spindle head clamping mechanism;

Fig. 11 is another fragmentary view of the spindle head clamping mechanism, taken in vertical section on the plane represented by the line 11—11 in Fig. 10;

Fig. 12 is a view in vertical section of the right spindle supporting head, taken longitudinally of the spindle on the planes represented by the line 12—12 in Fig. 4 and showing the spindle driving mechanism;

Fig. 13 is an enlarged fragmentary view of the right spindle head, generally similar to Fig. 12, and taken partly in vertical section on the plane represented by the line 13—13 in Fig. 4;

Fig. 17 is a schematic circuit diagram of the electrical control system for the spindle driving motors and the feeding motor of the machine;

Figure 14:
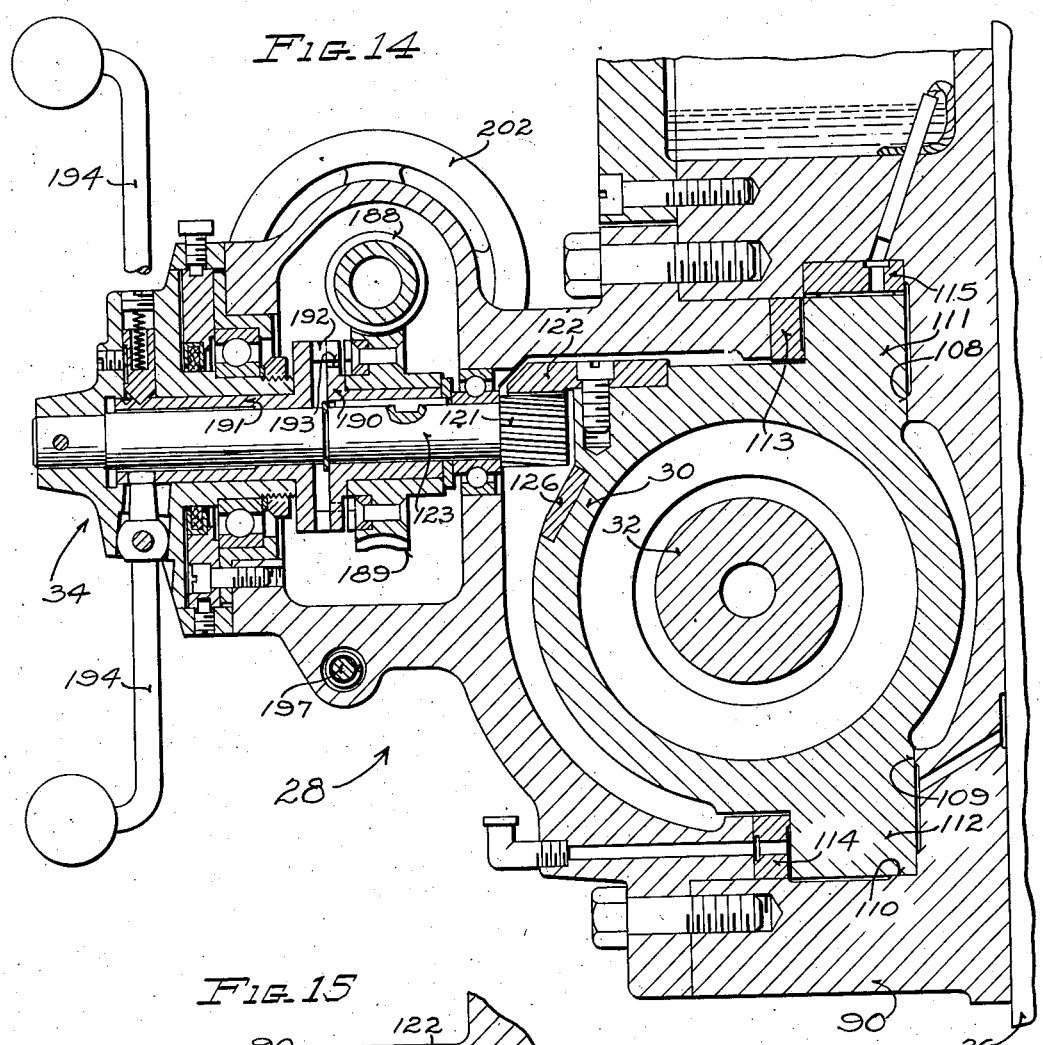
Fig. 14 is another view in vertical section of the right spindle head but taken transversely of the spindle on the plane represented by the line 14—14 in Fig. 1 and showing the spindle carrier feeding mechanism.

The particular machine tool shown in the drawings as exemplifying apparatus constituting a preferred embodiment of the invention, is a combined boring and milling machine of the double opposed spindle type, although it is to be understood that the various features of the invention may be utilized with equal advantage in other machine tools of different construction.

Referring more specifically to the drawings, Figs. 1 and 4 thereof in particular show generally, in front and side elevation, the boring and milling machine that is fully described herein by way of a complete disclosure of a practical embodiment of the invention. As shown in these views, it may be seen that the general structure of the machine comprises essentially a hollow bed or base 21 constituting the foundation or main frame of the machine and forming a housing for some of its actuating mechanism. On its upper surface the bed 21 is provided with ways which carry a work-supporting table 22 arranged for longitudinal reciprocatory feeding movement therealong.

As best shown in Fig. 1, the bed 21 is provided at its respective sides with bed extensions 23 and 24 projecting laterally therefrom and serving to support left and right upstanding tool carrying columns or uprights 25 and 26 at opposite sides of the work-supporting table 22 respectively. The columns 25 and 26 serve to carry tool spindle supporting headstocks or heads 27 and 28 respectively, each of which is arranged for independent vertical sliding movement along ways on the forward face of its supporting column. Mounted in the tool headstocks 27 and 28 are horizontal slidable spindle carriers or rams 29 and 30 which rotatably support opposed left and right tool carrying spindles 31 and 32 respectively. This arrangement provides for adjustment of the spindles horizontally in axial direction by movement of the spindle carrying rams and for adjustment thereof vertically by movement of the headstocks along the columns, whereby cutting tools carried by the spindles may be adjusted to any position, within the range of the machine, in a vertical plane transverse to the direction of movement of the work-supporting table 22 and in cooperating relationship therewith.

Each of the spindle carrying rams 29 and 30 may be moved manually relative to its supporting headstock by means of a star wheel or pilot wheel 34 and may be clamped rigidly to the headstock by actuating a ram clamping lever 36. Vertical movement of the headstocks 27 and 28 along the columns may be effected manually by means of a crank (not shown) applied to the squared end of one or the other of two actuating shafts 37 and 38, the actuating shafts being operatively connected to turn vertically disposed elevating screws 39 and 40 which engage and move the left and right headstocks 27 and 28 respectively. To facilitate upward movement of the spindle headstocks, each headstock is provided with a cooperating counterweight 45 concealed within the corresponding column and connected to exert upward force upon the headstock by means of chains 46 operating over idler sprockets 47 journalled in the top of the column, as shown in Fig. 4. Each of the headstocks may be clamped to its cooperating column by actuating a forwardly projecting clamping lever 50 to retain it in predetermined position thereon.

For adapting the machine to operate upon workpieces of various sizes, the columns 25 and 26 are movably mounted upon ways on the upper surfaces of the corresponding bed extensions 23 and 24, adjusting screws 51 and 52 being provided for engaging and moving the columns toward or from the table 22. The adjusting screws may be operated manually by means of a hand crank (not shown) which may be applied to the extending squared end of one or the other of two actuating shafts 53 and 54, the shafts being operatively connected by means of gear reduction mechanisms 55 and 56 to the screws 51 and 52 respectively. After the columns have been adjusted, they may be clamped to the bed extensions in well known manner by means of clamping bolts 57 which engage T slots 58 in the upper surface of the bed extensions and pass through holes in the bases of the columns.

In order that the headstocks 27 and 28 may be positioned vertically with a high degree of accuracy, as may be required for the purpose of bringing the opposed spindles 31 and 32 into axial alignment, each headstock is provided with precision measuring apparatus. As shown in detail in Fig. 6 with regard to the right headstock 28, the measuring apparatus includes a sensitive dial indicator 62 arranged to cooperate with measuring rods of accurately predetermined length. In order to position the headstock 28, a measuring rod 63 is interposed between an accurately finished abutment or button 64 fixed on the base of the column and a cooperating vertically aligned abutment 65 mounted on the under side of the spindle head. As shown in Fig. 6, the spindle head abutment 65 is provided with a projecting centrally disposed plunger 66 arranged for vertical sliding movement therein.

As the spindle head is moved downward by the elevating screw 40 in approaching its predetermined position, the top of the measuring rod 63 is engaged by the end of the plunger 66 thereby arresting downward movement of the plunger and causing it to effect pivotal movement of a lever 67 that is carried by a bracket 68 fixed on the spindle head. As shown, the lever 67 is pivotally mounted at its middle in the bracket 68 with one end engaging a notch in the plunger 66 and the other end engaging a similar notch in a rod 70 that is slidably mounted for vertical movement in the bracket. When the lever 67 is pivoted by upward movement of the plunger 66 after engagement of the measuring rod with the end of the plunger, the rod 70 is moved downward a corresponding distance against the resistance of a compression spring 71 which functions to retain the plunger 66 in projected position. The rod 70 is provided at its upper end with a transverse arm 72 that engages an actuating plunger 73 of the dial indicator 62 and causes the indicator to register the exact position of the spindle head. In effecting the final adjustment, downward movement of the spindle head is continued slowly until the dial indicator 62 shows that the head has arrived at the predetermined position, whereupon the head may be clamped to the column by actuating the previously mentioned clamping lever 50.

To bring the spindles 31 and 32 into axial alignment at a predetermined position relative to the work-supporting table 22, both of the heads 27 and 28 are accurately adjusted in this manner to equal heights above the corresponding column bases. After the adjustments have been completed, the accuracy of the alignment may be checked by means of a pair of telescopes 75 and 76 mounted on the spindle heads 27 and 28 respectively and directed upon cooperating targets 78 and 79 that are mounted respectively on the opposing spindle heads. Each telescope is provided with the usual cross-hair reticle, the arrangement being such that when the spindles are in accurate alignment the crosshairs of each telescope will register with corresponding marks on the cooperating target carried by the opposite spindle head the targets being preferably marked with cross lines 80 as shown in Fig. 3 with reference to the target 79. As more fully described and claimed in the co-pending application of Joseph B. Armitage, Charles O. Rothweiler and Theodore O. Salzer, Serial No. 273,544, filed May 13, 1939, the telescopes 75 and 76 function not only to check the relative vertical positions of the spindles 31 and 32 but also to check their relative horizontal positions and their angular alignment.

In the event that the spindles 31 and 32 are found to be off-set in a horizontal plane, they may be re-aligned by adjusting one or the other of the movable columns upon its supporting bed extension in direction longitudinally of the table 22 by the adjusting means shown in Fig. 2. As there shown, each of the columns, in this instance the column 25, is fitted in the ways in the top of the bed extension 23 by means of tapered gibs 83 and 84 each of which is provided at each end with an adjusting screw 85. In order to move the column 25 rearwardly, for example, relative to the base extension 23, the gib 83 is moved to the left by its adjusting screws and the gib 84 is moved to the right a corresponding amount, whereby the column may be shifted the distance necessary to bring the spindles into horizontal alignment, as indicated by the telescopes and their cooperating targets.

In the event that one of the spindles is misaligned angularly, the reticle of the corresponding telescope will be thrown out of register with its cooperating target, whereas the reticle of the telescope on the other head may register with its target or indicate only a slight misalignment. Under these circumstances the angular position of the column carrying the misaligned spindle may be corrected by scraping the gibs 83 and 84 to effect the necessary angular adjustment in a horizontal plane, and the angular position of the spindle head may be corrected by scraping the bearing surfaces in the head which cooperate with the ways on the column, to effect the necessary angular adjustment in a vertical plane.

By sighting through the telescopes 75 and 76 after the spindle heads have been adjusted to predetermined positions, the machine operator may be assured that the spindles are in accurate alignment if the telescope reticles register with the target lines. If on the other hand the telescopes should indicate that the spindles are not in alignment, the necessary steps may be taken to perfect the adjustment before machining operations are started upon a workpiece.

The spindle carrying heads 27 and 28 are each provided with independent driving motors 87 and 88 respectively, the motors being carried bodily by the corresponding heads and furnishing power both for rotating the tool spindles and for effecting feeding movement of the spindle carrying rams. The structures of the two heads are similar, each including a saddle member 90 which is slidably engaged with spaced ways on the front of the corresponding column, as shown in detail in Figs. 10 and 11 with regard to the right head 28 and column 26. As shown in Fig. 10, the saddle 90 is retained on the column by means of flat gibs or retaining strips 91 which are fitted to obviate lost motion between the face of the column and the saddle. The saddle 90 is further provided with a side bearing surface 92 which engages a way on one side of the column face and is retained in contact therewith without lost motion by means of a tapered gib 93 which engages an opposing bearing surface disposed between the main ways on the front of the column. To provide for movement of the spindle head 28 vertically along the column 26 by means of the elevating screw 40, the saddle 90 carries at its upper end a fixed nut 94 which engages and cooperates with the screw 40 in well known manner.

The clamping mechanism for retaining the spindle head in adjusted position on the column and which is actuated by the clamping lever 50, includes two vertically spaced pairs of spaced clamping arms. As shown in Figs. 10 and 11, a lower pair of clamping arms 95 and 96 are pivotally carried by a rearwardly extending part of the saddle 90 in position to engage respectively with clamping surfaces 97 and 98 disposed on the column in opposition to the main ways on the front face thereof. A second or upper pair of clamping arms 99 and 100, spaced vertically from the clamping arms 95 and 96, are likewise arranged to engage respectively with the clamping surfaces 97 and 98. By this arrangement the clamping surfaces in the column may be engaged at four widely spaced positions defining a rectangle in such manner that when all of the clamping arms are actuated equally, the saddle 90 is drawn into clamping engagement with the column face with equalized pressure and without danger of disturbing the alignment of the spindle.

In order that the several clamping arms may be moved simultaneously with equalized pressure upon actuation of the clamping lever 50, the lever is arranged to act upon equalizing linkage including an equalizing lever or bar 101 that is pivotally engaged at its middle by the rounded end of a plunger 102 which cooperates with an eccentric element 103 formed on the hub of the lever 50, the arrangement being such that when the lever is moved to clamping position the plunger 102 and the equalizing bar 101 are moved rearwardly. The clamping force exerted by the plunger 102 on the lever 101 is equalized between its ends, by reason of the medially pivoted connection of the lever with the plunger, for transmission equally to the two spaced pairs of clamping arms. To equalize the clamping pressure between the arms of each pair, the lever 101 is provided at its ends with pivotally mounted shoes 104 and 105 respectively, the shoe 104 engaging adjusting screws on the ends of the lower clamping arms 95 and 96 and the shoe 105 engaging similar adjusting screws on the ends of the upper clamping arms 99 and 100, the arrangement being such that when the clamping arms are thus forced into engagement with the surfaces 97 and 98, the saddle 90 is drawn into equalized clamping engagement with the forward face of the column.

For receiving the slidable spindle carrying quill or ram 30, the saddle is provided on its forward surface with spaced vertically disposed rectilinear plane bearing surfaces or ways 108 and 109 and also with a horizontally disposed plane bearing surface or way 110, as best shown in Fig. 14. The ram 30 is of massive solid construction in the form of a tubular quill provided with upper and lower integrally formed square webs or slide elements 111 and 112 extending upwardly and downwardly therefrom respectively and presenting complementary vertical and horizontal rectilinear bearing surfaces disposed parallel with the corresponding bearing surfaces on the saddle 90. The rearward vertical bearing surfaces on the slide elements 111 and 112 are complementary to and cooperate with the vertical bearing surfaces 108 and 109 on the saddle, respectively, and are retained in engagement therewith by means of a pair of tapered gibs 113 and 114 which engage the opposed vertical bearing surfaces on the forward sides of the slides. Likewise, the horizontal bearing surface on the lower side of the slide 112 is complementary to and cooperates with the horizontal bearing surface 110 on the saddle and is retained in engagement therewith by means of a tapered gib 115 which engages the opposed horizontal bearing surface on the top of the slide 111, as best shown in Fig. 12.

In order to adjust the structure for establishing precision alignment of the ram 30, the vertical and horizontal bearing surfaces in the saddle may be scraped or otherwise precisely finished to the required degree of accuracy. With the bearings thus fitted, the various tapered gibs 113, 114 and 115 are tightened to obviate lost motion and to maintain the bearing surfaces in accurate sliding engagement. To support the ram rigidly when it is retracted to the position shown in Fig. 1, the saddle 90 is provided with an outwardly extending supporting bracket 118 that presents a horizontal bearing surface 119 which cooperates with the lower surface of the slide element 112, as best shown in Fig. 4, to carry the overhanging end of the ram.

Figure 15:
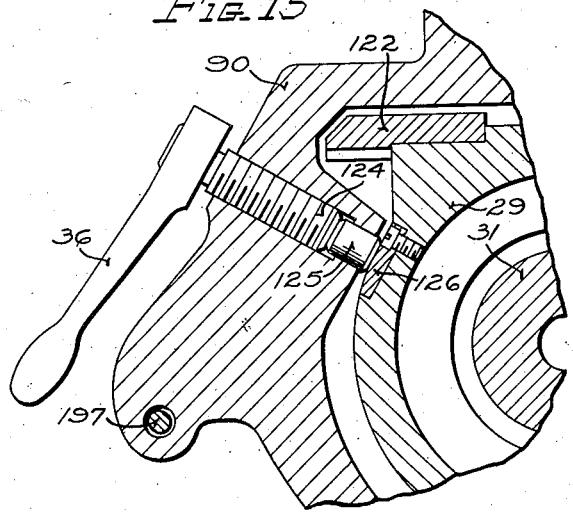
Fig. 15 is a fragmentary view generally similar to Fig. 14 but taken on the plane represented by the line 15—15 on the left spindle head in Fig. 1 and showing the spindle carrier clamping mechanism.

Longitudinal movement of the ram 30 is effected by means of a pinion 121 that engages a rack 122 secured to the ram, as appears in Figs. 14 and 15. The pinion 121 is carried on one end of a shaft 123 the other end of which carries the star wheel 34, the arrangement being such that upon turning the star wheel, the shaft and pinion are rotated and the ram moved longitudinally.

In clamping the ram 30 in its adjusted position, the clamping lever 36 turns a screw 124 which exerts pressure upon a clamping plug 125 that bears upon a hardened clamping strip 126 mounted on the upper forward side of the ram. As appears in Figs. 14 and 15, the clamping force is exerted by the screw 124 at an angle to the bearing surfaces and in the direction to force both the vertical bearing surfaces and the horizontal bearing surface on the ram slides into clamping or gripping engagement with the fixed vertical bearing surfaces 108 and 109 and the horizontal bearing surface 110 of the saddle ways, the arrangement being such that clamping may be effected without disturbing the alignment of the ram. As shown in Fig. 12, the tool carrying spindle 32 is rotatably supported in the forward part of the ram 30 by means of a pair of cooperating oppositely tapered roller bearings 128 and 129, and is supported at the rear of the ram by spaced cylindrical or plain roller bearings 130 and 131.

The spindle motor 88 for actuating the spindle driving and feeding mechanism in the head 28 is mounted on a portion of the head that carries a spindle driving speed changing mechanism 134. As best shown in Fig. 12, the motor is connected to drive an in-put shaft 135 of the speed changing mechanism 134, the shaft being connected by gearing 136 to a splined shaft 137. The splined shaft 137 carries two slidably mounted gear couplets 138 and 139 which may be shifted to engage selectively with complementary gears fixed on an intermediate or idler shaft 140, the arrangement being such that the shaft 140 may be driven at any one of four speeds. From the idler shaft 140 power is transmitted to a splined shaft 141 upon which is slidably mounted a shiftable gear 142 and a gear couplet 143, disposed to mesh selectively with and be driven by complementary gears on the shaft 140. By this arrangement, any one of three gear ratios may be established between the shaft 140 and the shaft 141, and since the shaft 140 has four speeds, the shaft 141 may be driven at any one of twelve speeds by various combinations of the gearing.

For shifting the gearing in the speed changer 134, there is provided a shifting crank 145 mounted on the forward face of the head as shown in Fig. 1 and connected to a shaft 146 which extends through the front wall of the head. A suitable speed indicating dial 147 is operatively associated with the crank 145 and functions to indicate the setting of the speed changer. Within the spindle head, as may be seen in Fig. 12, the shifting shaft 146 is connected to turn a cam plate 148 which is operatively connected by means of linkage 149 to shift the gear couplets 138 and 139, the arrangement being such that only one gear of the two couplets may be in mesh at any one time. The cam plate 148 is further operatively connected by intermittent gearing to actuate another cam plate 150 provided with cam grooves on both sides and which functions through linkage 151 to shift the gear 142 and the couplet 143 in coordinated relationship with the shifting of the couplets 138 and 139, the arrangement being such that for each turn of the crank 145 a different gear ratio is provided between the motor 88 and the splined sleeve shaft 141.

From the speed changing mechanism 134, power is transmitted to a speed range changing mechanism 156 carried by the slidably mounted ram 30, by means of a splined shaft 155 which is slidably received in complementary internal splines within the sleeve shaft 141. As shown, the shaft 155 is rotatably mounted in and carried by an upwardly extending housing 157 fixed on the outer end of the ram 30, the arrangement being such that when the ram is moved in adjusting the axial position of the spindle, the splined shaft 155 will slide within the splined sleeve 141, thereby maintaining the driving connection.

A gear wheel 158 mounted on the shaft 155 within the housing 157 transmits power to a gear wheel 159 on a parallelly disposed splined shaft 160. The splined shaft 160 carries a range changing gear couplet 161 including a pinion 162 that is arranged to be meshed selectively with a complementary bull gear 163 fixed on the spindle 32 for driving the spindle in the lower speed range. The spindle 32 is also provided with a pinion 164 disposed to be meshed selectively by a relatively large gear wheel 165 of the couplet 161 for driving the spindle in the high speed range. The range changing couplet 161 may be shifted to select the range of operation by means of a shifting fork 166 that is actuated by means of a range changing lever 167 mounted on the front of the housing 157 as shown in Fig. 1.

Since the speed changing mechanism 134 provides twelve different speeds and the range changer 156 provides two speed ranges, it is apparent that the spindle 32 may be driven selectively at any one of twenty-four speeds by suitably manipulating the speed changing crank 145 and the range changing lever 167. The speed indicating dial 147 is preferably arranged to be read in conjunction with the position of the range changing lever 167 to indicate the speed at which the spindle will be driven with any combination of settings of the speed changer and the range changer. Change in the direction of rotation of the tool spindle may be effected electrically by reversing the direction of rotation of the spindle driving motor, by means of a reversing switch, as indicated in the wiring diagram Fig. 17.

Power for effecting feeding movement of the ram 30 relative to the saddle 90 is derived directly from the spindle 32 by means of a worm 171 formed on the spindle and meshing with a worm wheel 172 carried by a shaft 173 disposed transversely of the spindle. As shown in the enlarged view Fig. 13, the shaft 173 is provided with pinion teeth which mesh with a gear wheel 174 on a shaft 175 arranged to receive on its forward end a removably mounted pick-off gear 176 that meshes with a complementary pick-off gear 177 removably mounted on the outer end of a parallel shaft 178. The two pick-off gears are interchangeable and replaceable and constitute a rate changing mechanism 179 in the ram driving train, the mechanism being carried by the ram and accessible for changing the pick-off gears upon opening a cover 180 on the front of the housing 157, as shown in Figs. 1 and 4.

The shaft 178 carries a bevel gear reversing mechanism 181 that is arranged to transmit power in either direction selectively to a splined shaft 182 disposed parallel with the spindle 32, a reversing lever 183 being provided for shifting the reverser 181 to change the direction of rotation of the shaft 182 and consequently the direction of feeding movement of the spindle.

As appears in Figs. 1 and 13, the ram driving splined shaft 182 is journalled in and extends forward from the housing 157 into the spindle head 28 where it has sliding engagement with a clutch sleeve 185 which is slidably and rotatably mounted therein and is provided with internal splines complementary to the splines of the shaft 182, the arrangement being such that longitudinal movement of the ram 30 may be effected without interfering with the driving connection between the shaft 182 and the sleeve 185. For engaging the power feed, the clutch sleeve 185 may be moved axially, by means of a feed clutch shifting lever 186, into engagement with a complementary clutch sleeve 187 carrying a worm 188 that meshes with a worm wheel 189. The worm wheel 189 is rotatably carried by and functions to drive the shaft 123 that constitutes the operative connection between the star wheel 34 and the pinion 121 which meshes with the rack 122 for moving the ram 30, as shown in Fig. 14.

To provide a power driving connection between the worm wheel 189 and the shaft 123, the shaft has rigidly keyed to it a supporting element presenting a driving flange 190 disposed at one side of and adjacent to the worm wheel and provided with a tubular extension which projects through the worm wheel 189 and functions as a bearing for rotatably supporting it. A selectively engageable coupling may be effected between the flange and the worm wheel by means of a clutch sleeve 191 that is slidably mounted on the shaft 123 and presents axially projecting clutch teeth 192 that are disposed to slidably engage notches or slots 193 in the periphery of the flange 190 and to enter complementary clutch teeth in the worm wheel 189. As shown, the clutch sleeve 191 on the shaft 123 presents notches which are engaged by the inner ends of a plurality of pivotally mounted lever arms or spokes 194 that constitute the star wheel 34, the arrangement being such that when the outer end of any one of the levers 194 is moved outward or forward, the sleeve 191 will be moved inwardly in manner to slide its clutch teeth through the notches 193 and engage them with the complementary clutch teeth in the worm wheel 189. By this arrangement, the power feeding connection is effected with minimum possibility of back lash and without interfering with the positive connection between the star wheel 34 and the ram moving pinion 121.

With both the clutch sleeve 185 and the clutch sleeve 191 in engaged position, power will be transmitted from the tool spindle 32 to the ram actuating pinion 121 at the speed selected by the range changer 179 and in the direction selected by the reversing mechanism 181. Since the ram feeding mechanism is driven directly from the spindle 32, a desired predetermined relationship may be established readily between the rotary movement of the spindle 32 and its longitudinal movement for effecting screw cutting or other spiral cutting operations, there being a minimum amount of back-lash or lost motion in the feeding system. Furthermore, after the predetermined relationship between the rotary and longitudinal movements of the spindle has been established to provide the desired spiral lead, the cutting speed may be selected and changed at will merely by adjusting the speed changing mechanism 134 and the range changer 156, without interfering with the pitch of the spiral being machined.

Forward feeding movement of the ram 30 may be arrested at any one of a plurality of pre-selected positions by means of a turret stop mechanism 195 of the type disclosed and claimed in Patent No. 1,968,276, issued July 31, 1934, to Joseph B. Armitage. As appears in Figs. 1 and 13, the turret stop mechanism 195 is carried by the ram 30 and presents a plurality of individually adjustable trip members or stop rods 196 any one of which may be turned into position to engage a stop plunger 197 when the ram is moved forward to a predetermined position. As shown in Fig. 13, the plunger 197 is provided with a notch which engages the lower end of a medially pivoted lever 198 the upper end of which engages a groove in the shiftable clutch sleeve 185. When the stop plunger 197 is moved to the left as shown in Fig. 13 by the engagement therewith of an advancing stop rod 196, the lever 198 is pivoted in manner to move the sleeve 185 to the right to disengage it from the clutch sleeve 187 thereby disconnecting the ram feeding drive.

For effecting precise positioning of the ram after the drive has been thus disconnected, a sensitive dial indicator 200 is provided on the front of the head adjacent to the dial indicator 62 and arranged to be actuated by means of a forwardly extending portion of the stop plunger 197. Precise adjustment of the position of the ram is effected by turning a small hand wheel 202 fixed on the forwardly extending end of the sleeve 187 carrying the worm 188 that meshes with the worm wheel 189 on the ram actuating shaft 123.

After the ram has been precisely adjusted by means of the hand wheel 202 with reference to the dial indicator 200, the self-locking or irreversible driving connection afforded by the worm 188 and the worm wheel 189 serves to retain it in the adjusted position, or if desired the clamping lever 36 may be actuated to clamp the ram rigidly to the saddle 90, as previously explained. Rapid movement of the ram 30, such as may be required in retracting it after a cutting operation has been completed, is accomplished manually by rotating the star wheel 34, the arms 194 thereof being moved inwardly to the position shown in Fig. 14 to disengage the teeth 192 of the clutch sleeve 191 from the clutch teeth in the worm wheel 189.

Figure 16:
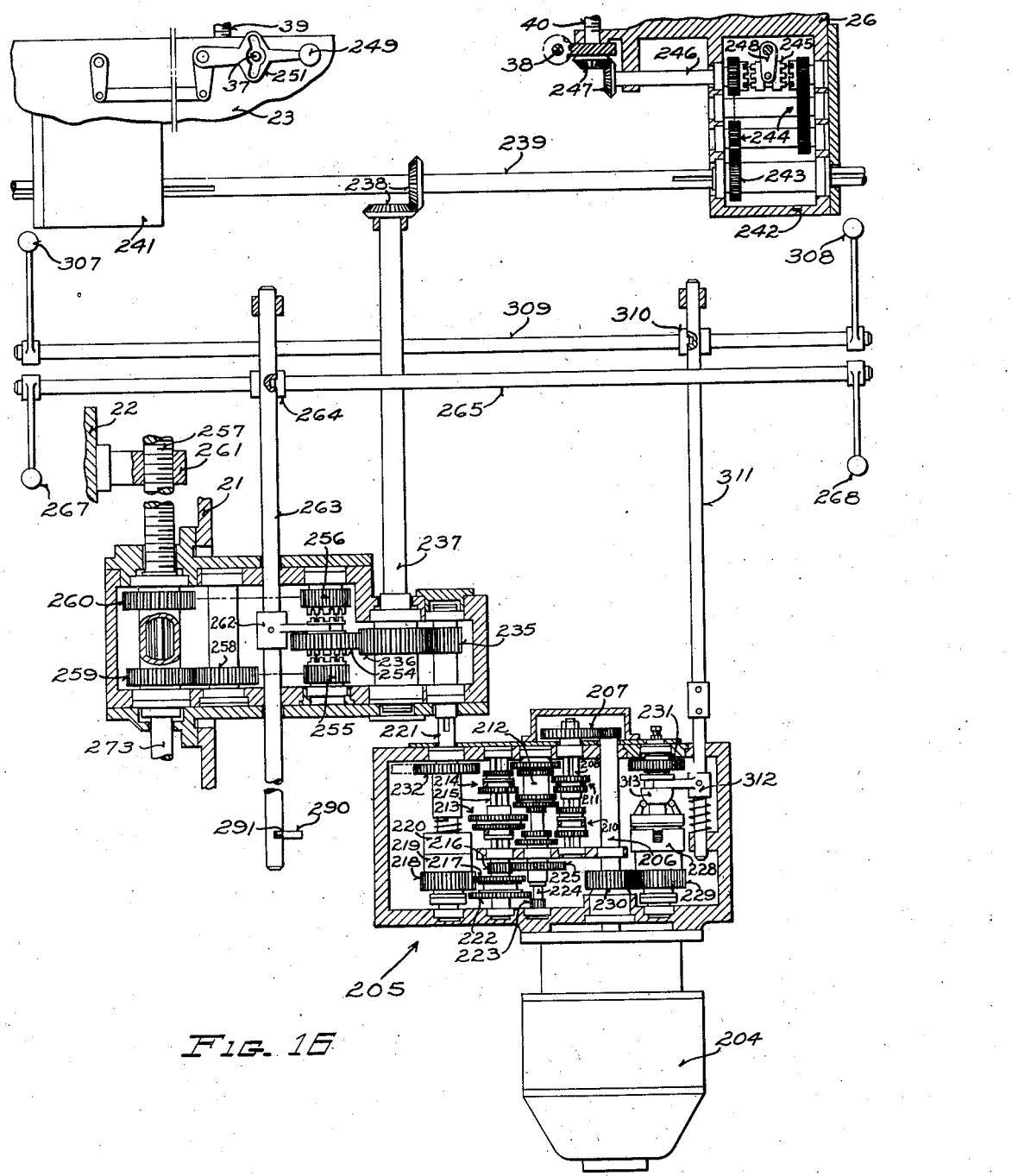
Fig. 16 is an expanded, partly schematic view, taken generally in horizontal section, of the transmission mechanism for effecting relative feeding movement between the tool spindles and the work-supporting structure.

Power for effecting various relative movements between the work-supporting table and the tool spindles is derived from a feeding motor 204 mounted on the end of the bed 21, as shown in Figs. 1 and 4. As appears in the expanded view Fig. 16 showing the transmission mechanism, the motor 204 is connected to drive a speed or feed rate changing mechanism 205, the motor being coupled to an in-put shaft 206 which is connected by gearing 207 to drive a splined shaft 208. Slidably mounted on the splined shaft 208 are two gear couplets 210 and 211 which may be engaged selectively with complementary gears on an intermediate idler shaft 212. The gears of the idler shaft 212 are arranged to be engaged selectively by and to drive complementary gear couplets 213 and 214 slidably mounted on a parallelly disposed splined shaft 215. The splined shaft 215 also carries a clutch pinion 216 which engages selectively with a clutch gear 217 that is slidably mounted on and is free to turn relative to the shaft 215. The clutch gear 217 meshes at all times with a gear 218 connected by an overload release device 219 and an overrunning clutch device 220 to a support driving shaft 221. The clutch gear 217 is connected with a gear wheel 222 in manner to constitute therewith a gear couplet, the arrangement being such that when the clutch 217 is moved out of engagement with the driving clutch 216, the gear wheel 222 will be moved into meshing engagement with a pinion 223 on a stub shaft 224. The stub shaft 224 is driven at reduced rate by means of a gear wheel 225 fixed thereon and meshing with the clutch pinion 216 on the shaft 215, the clutch pinion 216 and the pinion 223 cooperating with the couplet constituted by the clutch gear 217 and the gear wheel 222 in manner to function as a range changer. By this arrangement of the gearing, any one of thirty-two gear ratios may be established between the in-put shaft 206 and the support driving shaft 221 to provide thirty-two rates of feeding movement for the work-supporting table and the tool spindle carrying heads. Adjustment of the rate changer 205 in selecting the desired feed rate is effected by actuating a rate changing crank 226, mounted on the side of the base 21 as shown in Fig. 4, the rate being indicated upon an associated dial 227.

For effecting relative movement of the spindles and work-support at rapid or quick traverse rate, there is provided a rapid traverse clutch 228 having an in-put gear wheel 229 that is driven by a meshing gear wheel 230 fixed on the shaft 206 which is directly connected to the motor 204. When the clutch 228 is engaged, it drives a gear wheel 231 that meshes with a complementary gear wheel 232 on the support driving shaft 221, the overrunning clutch 220 which constitutes the driving connection between the feed rate driving gear 218 and the support driving shaft 221 permitting the shaft to turn at rapid traverse rate without interference from the feed rate changing mechanism 205.

As shown in Fig. 16, the support driving shaft 221 is provided with a pinion 235 which meshes with a gear wheel 236 on a shaft 237 extending longitudinally of the machine bed 21 and connected by bevel gearing 238 to drive a transverse shaft 239. The ends of the transverse shaft 239 extend into reversing gear boxes or mechanisms 241 and 242 carried by the columns 25 and 26 respectively, the two reversing mechanisms being similar in construction. As shown with regard to the reversing mechanism 242, the shaft 239 has slidably keyed upon it a sleeve gear 243 in manner to permit movement of the mechanism with the column 26 upon its bed extension 24 wthout interfering with the driving connection. The sleeve gear 243 is connected by reverse gearing 244 and a selective reversing clutch sleeve 245 to a shaft 246 that is connected by bevel gearing 247 to the lower end of the spindle head elevating screw 40, the arrangement being such that with the clutch sleeve in the neutral position as shown, the driving mechanism is disconnected from the elevating screw 40. Upon movement of the clutch sleeve 245 in the one or the other direction by means of a cooperating shifting fork 248, the shaft 246 and the elevating screw 40 may be driven in either direction selectively at the rate established by the rate changing mechanism 205. Actuation of the shifting forks 248 to adjust the reversing mechanisms 241 and 242 is effected by means of reversing levers 249 and 250 (both shown in Fig. 1) each of which is operatively connected to move the corresponding shifting fork 248 and the cooperating clutch sleeve 245. As shown, each lever is provided with an interference ring or guard 251 which prevents application of a hand crank to the end of the shaft 37 or 38 when the corresponding clutch sleeve is engaged, and likewise prevents movement of the reversing lever to engage the clutch when a crank is applied to the associated shaft end. By this arrangement either spindle head may be actuated manually or may be driven by power either up or down selectively at the rate established by the rate changing mechanism 205.

The work table 22 may be driven selectively in either direction by means of a clutch gear 254 which meshes with the gear 236 on the shaft 237 and is arranged to be moved from the neutral position shown in Fig. 16 into engagement with either a clutch gear 255 or a clutch gear 256. The gears 255 and 256 are operatively connected to drive a table actuating screw 257 in opposite directions, respectively, the clutch gear 255 being meshed with an idler gear 258 which in turn meshes with a gear 259 fixed on the screw 257 while the clutch gear 256 meshes directly with a gear 260 likewise fixed on the screw. As shown in Fig. 16, the screw 257 has threaded engagement with a nut 261 depending from the table 22, the arrangement being such that when the screw is rotated the table is moved in the one or the other direction. The table screw 257 is preferably protected by a guard such as is shown in the co-pending application of Joseph B. Armitage, Serial No. 142,781, filed May 15, 1937, now Patent No. 2,198,102, dated April 23, 1940.

Shifting movement of the table reversing clutch gear 254 is effective by means of a shifting fork 262 carried on a shifting rod 263 presenting a notch which is engaged by the end of an arm 264 on a rocking shaft 265 that extends transversely of the machine bed 21 and is provided at its projecting ends with hand levers 267 and 268 respectively. The levers 267 and 268 are disposed for convenient operation at each side of the machine bed 21, as shown in Fig. 1 and furthermore they are connected by links 270, respectively to auxiliary levers 272 spaced therefrom along the bed to provide for convenient control of the table feed mechanism from another position.

The table screw 257 is provided with an extending shaft portion 273 which projects from the end of the bed 21 as shown in Figs. 1, 4 and 5 and that may be engaged by a hand crank 274 (shown in Fig. 1) for effecting manual movement of the table. In order to provide for accurately positioning the table 22 along the bed 21, a precision measuring apparatus shown in Fig. 5 and including a dial indicator 276, is arranged to cooperate with measuring rods 277 carried in a trough 278 in the bed 21. The measuring rods are disposed to be engaged by the table in the course of its movement, whereby the dial indicator 276 will be actuated to indicate precisely the position of the table in well known manner.

For effecting precise movement of the table, a pair of hand wheels 279 and 280 are provided, the wheels being disposed at opposite sides of the bed 21 and fixed on the ends of a transverse shaft 282. As shown in Fig. 5, the transverse shaft 282 is provided with a worm 283 which meshes with a worm wheel 284 that may be coupled selectively to the screw extension shaft 273 by means of a friction clutch 285. A clutch actuating spool 287 for engaging or disengaging the clutch 285 is slidably mounted on the shaft 273 and is operatively connected by linkage 288 to be actuated by a hand lever 289 pivotally mounted on the end of the bed 21. Since the hand wheels 279 and 280 would be rotated rapidly if they were connected to the shaft 273 when it is being driven by power at rapid traverse rate, an interlocking arrangement is provided to prevent simultaneous engagement of the hand wheel clutch 285 and the table driving clutch gear 254. For this purpose, an interlocking plunger 290 is arranged to be actuated by the linkage 288 and is disposed to enter a notch 291 in the shifting rod 263 when the table driving clutch gear 254 is in neutral position, thereby permitting movement of the linkage to engage the hand wheel clutch 285 and locking the rod 263 against longitudinal movement to retain the clutch gear 254 in neutral position. Furthermore, whenever the clutch gear 254 is engaged with either the clutch gear 255 or the clutch gear 256, the notch 291 is moved out of register with the interlocking plunger 290 thereby locking the linkage 288 against movement and preventing engagement of the hand wheel clutch 285.

After the table 22 has been accurately positioned, it may be clamped rigidly to the bed 21 by actuating a table clamping lever 295 mounted on the side of the bed as shown in Fig. 4. As shown in detail in Figs. 7, 8 and 9, the clamping lever 295 is connected to turn an eccentric element 296 disposed between a pair of arms constituting the bifurcated end of a lever 297 which is pivotally supported at its other end upon the bed 21 by means of a pin 298. Adjacent to its pivoted end, the lever 297 is provided with a pin 299 which engages a slot in the bifurcated lower end of a clamping rod 300 that carries at its upper end a clamping shoe 301. As best shown in Fig. 9, the shoe 301 is provided with an inclined face complementary to and bearing upon the inclined face of a gib 302 that is carried by the table 22. When the clamping lever 295 is moved to clamping position, the eccentric 296 moves the lever 297 downward thereby drawing the clamping shoe 301 downward and forcing it into clamping engagement with the inclined bearing surface of the gib 302, whereby the table 22 is clamped rigidly to the bed 21 without changing its position relative thereto. As shown in Fig. 9, the clamping shoe 301 is secured to the upper end of the clamping rod 300 by means of a retaining screw 303, the arrangement being such that the clamp may be adjusted to compensate for wear by removing the screw and refitting the shoe to the rod, preferably by grinding down the shank of the shoe, the screw 303 then being replaced to retain the shoe in its new clamping relationship with the gib.

Control of the rapid traverse clutch 228 for causing movement of the table and of the spindle heads at rapid traverse rate is effected by means of rapid traverse levers 307 and 308 disposed at opposite sides of the bed 21, respectively, and fixed on the ends of a transverse rocking shaft 309. As shown in Fig. 16, the shaft 309 is provided with an arm 310 the end of which engages a notch in a control rod 311 carrying a shifting fork 312 that engages a clutch spool 313 in manner to move it for engaging or disengaging the rapid traverse friction clutch 228. Engagement of the clutch 228 causes movement of the table or heads to occur at rapid traverse rate in accordance with the positions of the various reversing and disconnecting mechanisms as previously explained.

Trip mechanism preferably of the well known table dog type, may be provided for automatically actuating the table controlling mechanism. For automatically controlling the vertical movement of the spindle heads, each column is provided with a vertically disposed trip rod 316, as shown in Figs. 4 and 10, each rod being slidably engaged by an arm 317 carried by the corresponding spindle head. As shown in Fig. 4, each trip rod 316 is provided with two adjustable trip collars 318 and 319 disposed at opposite sides of the arm 317, and each rod is connected by linkage 320 with the actuating mechanism for moving the shifting fork 248 associated with the reversing clutch sleeve 245, of the corresponding reversing mechanism. The arrangement of the linkage 320 is such that the clutch sleeve 245 will be moved to its neutral position by movement of the trip rod 316 upon the engagement of the arm 317 with either of the tripping collars 318 or 319, whereby power movement of the spindle head may be stopped at either of two predetermined positions in its path of vertical travel.

Electrical energy for operating the spindle motors 87 and 88, the feed motor 204, and other electrical equipment on the machine, is derived from a power source indicated by line conductors L1, L2 and L3 in the circuit diagram, Fig. 17. As shown, a master switch 325 is provided for controlling the flow of current from the power source into the lines leading to all of the motors and the other electrical equipment, the feed motor 204 being independently controlled by means of an electrically operated motor switch 326, and the spindle motors being likewise independently controlled by means of electrically operated motor switches 327 and 328, respectively.

Referring to Fig. 4, there is provided on each side of the machine bed 21 a master switch closing push button 331 and a master switch opening push button 332, the buttons being indicated diagrammatically in Fig. 17. To energize the electrical circuit in the machine prerequisite to starting the motors, the master switch closing push button 331 on either side of the machine is depressed, thereby completing a control circuit which leads from the line conductor L2 through a conductor 333, to the depressed push button switch 331, and thence through either a conductor 334 or a conductor 335, as the case may be, to a solenoid 336 of the switch 325 from which a conductor 337 leads to the line conductor L1.

Energization of the solenoid 336 in this manner closes the master switch 325 and at the same time establishes a holding circuit through an auxiliary contactor 340. The holding circuit leads from the line conductor L2 and the conductor 333 through both of the normally closed switch opening push buttons 332 in series circuit relationship, and thence through the auxiliary contact 340 and a conductor 341 to the solenoid 336 from which the conductor 337 leads to the line conductor L1. The switch opening push buttons 332 being in series relationship, the machine operator may deenergize the circuit from a position at either side of the machine by depressing either one of the two push buttons, thereby opening the holding circuit and deenergizing the solenoid 336 to permit the switch 325 to move to open position.

With the master switch 325 in the closed position and the lines leading to the motors thus energized, the right hand spindle motor 88, for example, may be controlled by means of a spindle motor starting push button switch 343 and a normally closed stopping push button switch 344, the switches being mounted on the right side of the machine bed 21 adjacent to the column 26, as shown in Fig. 4. Referring now to the circuit diagram Fig. 17, when the motor starting button 343 is depressed, a control circuit is established which leads from the line conductor L2 through a conductor 349, a contactor 350 of a protective overload relay 351 associated with the motor 88, and a conductor 352 to the depressed push button switch 343 and thence through a conductor 353 leading to a solenoid 354 of the motor switch 328, from which a conductor 355 leads to the line conductor L1.

With the solenoid 354 thus energized, the switch 328 is closed thereby supplying power to the motor 88 and closing a holding circuit auxiliary contact 356. With the auxiliary contact 356 closed, the holding circuit leads from the conductor 352 to the normally closed motor stopping push button switch 344 (instead of to the starting switch 343 which may then be released), the current then flowing through the push button switch 344, a conductor 358 and thence through the closed auxiliary contactor 356 and a conductor 359 leading to the solenoid 354, from which the conductor 355 leads to the line conductor L1.

If now the motor 88 should stall or otherwise become overloaded, the overload relay 351 will open, thereby opening the control circuit and permitting the switch 328 to move to open position. Likewise when it is desired to stop the motor, the normally closed push button switch 344, which is disposed on the side of the bed 21 beneath the starting switch 343, may be depressed to open the control circuit in similar manner.

The left hand spindle motor 87 is similarly controlled by means of a push button starting switch 360 and a normally closed push button stopping switch 361 the switches being disposed on the left side of the machine bed 21, adjacent to the column 25 and opposite the right spindle switches 343 and 344. When the starting switch 360 is depressed, a control circuit for energizing the motor 87 is established from the line conductor L2 through a conductor 362, a contactor 363 of a protective overload relay 364 associated with the motor 87, then by a conductor 365, to the depressed push button switch 360 and thence through a conductor 366 to a solenoid 367 of the motor switch 327, from which the conductor 355 leads to the line conductor L1.

With the solenoid 367 thus energized, the switch 327 is closed to supply power to the motor 87 and to establish a holding circuit through an auxiliary contact member 368. With the auxiliary contact member 368 in closed position, the holding circuit extends from the conductor 365 through the normally closed stop push button switch 361 and thence through a conductor 369, the auxiliary contact 368 and a conductor 370 to the solenoid 367 from which the conductor 355 leads to the line conductor L1.

If now the motor 87 becomes overloaded, the overload relay 364 will open thereby opening the control circuit and deenergizing the solenoid 367 to permit the switch 327 to move to open position. Likewise, if the normally closed push button switch 361 is depressed, the control circuit will be opened, causing the switch 327 to open and the motor 87 to stop.

For controlling the direction of rotation of the tool carrying spindles 31 and 32, the motors 87 and 88 are each provided with a reversing switch 371, as indicated in the wiring diagram, the switches being of any well known type appropriate for effecting reversal of the motors.

The feeding motor 204 for effecting feeding movements of the work-supporting table and the tool spindle heads, as previously explained, may be started from either side of the machine by depressing either one of a pair of starting push button switches 372 disposed on opposite sides of the bed 21 respectively, and adjacent to the starting buttons for the respective spindle motors. According to a feature of this invention, the feeding motor 204 is arranged to be started for effecting relative feeding movement, only after one or both of the spindle motors has been put into operation, and is arranged to be stopped automatically upon the occurrence of an overload condition in either spindle motor regardless of whether only one or both of the spindle motors are operating at the time. To this end, the control circuit for energizing the feed motor is derived through contactors 373 and 374 on the spindle motor overload relays 351 and 364 respectively, the contactors being connected in series circuit relationship, and then through one or the other of auxiliary interlocking contactors 375 and 376 associated with the spindle motor switches 327 and 328, respectively, and connected in parallel circuit relationship. Accordingly, when either one of the feed motor starting push buttons 372 is depressed, a control circuit is established from the line conductor L2 through the conductor 349, a conductor 377, the contactor 373 of the overload relay 351, a conductor 378, and the contactor 374 of the overload relay 364, to a conductor 379, from which the circuit leads through either the auxiliary contactor 375 associated with the spindle motor 87, or the auxiliary contactor 376 associated with the spindle motor 88, depending upon which motor is operating at the time, to a conductor 380, from which a conductor 381 leads to the feed motor starting push buttons 372, and thence through the depressed push button and a conductor 382, to a solenoid 383 of the feed motor starting switch 326 from which a conductor 384 leads to the line conductor L1.

Upon the solenoid 383 being thus energized, the switch 326 is closed to supply power to the feeding motor 204 and to close an auxiliary contactor 385 for establishing a holding circuit. As shown, the holding circuit extends from the conductor 381 through a pair of normally closed stop push button switches 386 connected in series relationship and associated respectively with the starting push button switches 372 on opposite sides of the machine bed 21. The circuit then leads through the contactor of a protective overload relay 387 associated with the motor 204, thence through the auxiliary contactor 385, and a conductor 388, to the solenoid 383 which is connected by the conductor 384 to the line conductor L1.

With the holding circuit thus established, the feeding motor 204 will continue to run after the starting push button switch has been released but will be stopped automatically upon the occurrence of overload in any one of the three motors, since the control circuit leads through all of the overload relays 351, 364 and 387 in series circuit relationship. Furthermore, the feed motor 204 will be stopped automatically in the event that both spindle motors are stopped by opening the spindle motor switches 327 and 328, since with both the parallelly connected auxiliary interlocking contactors 375 and 376 open the control circuit is interrupted, however, either one of the spindle motor switches may be opened without interfering with the operation of the feed motor as long as the other spindle motor switch remains closed.

Although it is highly desirable to prevent the feed motor 204 from operating to effect feeding movements unless at least one of the spindle motors is running in order that the work in the machine may not be fed against a stationary cutter inadvertently, it is also desirable that the work table 22 and the spindle heads 27 and 28 may be moved at rapid traverse rate in setting up work on the machine without the necessity of energizing the spindle motor. To this end there is provided a normally open rapid traverse switch 392 which is operatively connected to be actuated by the rapid traverse lever 308, as indicated in Figs. 4 and 17, and that functions in the manner set forth and claimed in Patent No. 2,081,288, issued May 25, 1937 to Joseph B. Armitage.

When the lever 308 is moved to rapid traverse position, the switch 392 is closed thereby establishing a shunt control circuit for energizing the feed motor switch 326, which leads from the line conductor L2 through the conductor 349, the conductor 377, the contactor 373 of the overload relay 351, the conductor 378, and the contactor 374 of the overload relay 364 to the conductor 379. Instead of then leading as before through one of the auxiliary contactors 375 and 376 associated with the spindle motors, the circuit now extends directly from the conductor 379 through a conductor 394 and the closed rapid traverse switch 392 to a conductor 395 which connects with the conductor 382 leading to the solenoid 383 of the switch 326 from which the conductor 384 leads to the line conductor L1. This results in closing the switch 326 and supplying power to the motor 204 for moving the table or the spindle heads at rapid traverse rate as long as the lever 308 is held in rapid traverse position. Since neither spindle motor is in operation, the parallelly connected contactors 375 and 376 in the holding circuit are both open, hence the control circuit will be interrupted and the switch 326 will open and stop the motor as soon as the lever 308 is moved to open the rapid traverse switch 392. By this arrangement the motor 204 may be operated to effect rapid traverse movement of the table and the heads regardless of whether or not the spindle motors are operating, while to effect movement at feed rate it is necessary that one or the other of the spindle motors be energized, the circuit being further so arranged that the feed motor 204 will be stopped automatically upon the occurrence of an overload in any one of the motors.

From the foregoing description and explanation of the operation of the boring and milling machine herein set forth as exemplifying the invention, it is apparent that there has been provided an improved machine tool structure and control system by means of which a work-supporting structure and cooperating tool spindles may be relatively positioned and correlated in operation in manner to perform work conveniently and efficiently and with a high degree of accuracy.

Although the illustrative embodiment of the invention has been described in considerable detail for the purpose of setting forth a practical operative exemplifying apparatus, it is to be understood that the particular structure and control system herein described are intended to be illustrative only and that the various inventive features may be incorporated in other structural forms without departing from the spirit and scope of the invention as defined in the subjoined claims.

The principles of the invention having now been fully explained in connection with the foregoing description of the embodying apparatus, we hereby claim as our invention:

1. In a boring and milling machine having a base, the combination with a work-supporting table slidably mounted for horizontal movement on said base, a pair of columns upstanding on said base one at each side of said table, a spindle head slidably mounted for vertical movement on each of said columns, and a tool supporting spindle rotatably mounted in each of said heads in position to cooperate with said work-supporting table, of driving means for moving said table and said spindle heads, said driving means comprising a driving motor, a speed changing mechanism disposed to be driven by said motor and adapted to transmit power selectively at any one of a plurality of feed rates, a transmission train including reversing and disconnecting mechanism disposed to transmit power from said speed changing mechanism to said table to drive it selectively in either direction, transmission trains each including reversing and disconnecting mechanism disposed to transmit power from said speed changer to each of said spindle heads to drive each head selectively in either direction individually, and rapid traverse driving mechanism selectively engageable to actuate all of said transmission trains for moving said table and said heads at rapid traverse rate in accordance with the driving connections effected by the corresponding reversing and disconnecting mechanisms.

2. In a machine tool, the combination with a column presenting a bearing face and a supporting member slidably mounted on said bearing face, of means for clamping said supporting member to said column, comprising two spaced pairs of pivoted clamping arms arranged to engage said column at positions disposed to define a rectangle and acting in direction to clamp said slidable member against said bearing face of said column, a clamping device for engaging said clamping arms, an equalizing lever disposed to be engaged at its middle by said clamping device and operative to exert equal forces at its ends upon said spaced pairs of clamping arms, respectively, and a pair of equalizing shoes each pivotally mounted at its middle on one end of said equalizing lever and each disposed to engage with its ends the pivoted arms constituting one pair of said clamping arms in manner to equalize the forces exerted by the corresponding end of said lever between the clamping arms of said pair, whereby force exerted by said clamping device may be equalized between the four clamping arms in manner to clamp said supporting member to said bearing face of said column with equalized pressure.

3. In a machine tool having a work-supporting table, a tool supporting head mounted for movement relative to said table, a ram slidably mounted in said head, a tool spindle rotatably mounted in said ram for movement bodily therewith, a motor carried by said head and operative to drive said spindle, a speed changing transmission mechanism carried by said head and operatively connected to be driven by said motor, a range changer carried by said ram for bodily movement therewith, and means for transmitting power from said speed changer on said head to said range changer on said ram, said range changer being operatively connected to transmit power to said spindle selectively in either a high speed range or a low speed range.

4. In a machine tool having a bodily movable spindle supporting head, a spindle supporting ram carried by said head, a tool supporting spindle rotatably mounted in said ram for bodily movement therewith, a plurality of angularly disposed rectilinear bearing surfaces formed in said head for slidably supporting said ram, complementary rectilinear bearing surfaces formed on said ram and disposed to slide upon said bearing surfaces in said head in manner to provide for axial movement of said tool spindle relative to said head, and retaining means disposed to maintain the bearing surfaces on said ram in close engagement with the bearing surfaces in said head to insure accurate alignment of said spindle at any position assumed by said ram.

5. In a machine tool, the combination with a frame presenting two bearing surfaces disposed at right angles to each other, of a member slidably mounted on said frame and presenting bearing surfaces complementary to and disposed in engagement with the bearing surfaces presented by said frame, means carried by said frame to retain said complementary bearing surfaces in cooperating engagement, and a clamping device disposed to engage said slidably mounted member at a position opposed to said bearing surfaces and operative when engaged to force both of the bearing surfaces on said slidable member into clamping engagement with the complementary bearing surfaces on said frame, whereby said slidable member may be positioned accurately relative to said frame by sliding it along said bearing surfaces and then clamped securely by said clamping device without changing its position.

6. In a machine tool having a bodily movable spindle supporting head, a spindle supporting ram carried by said head, a tool supporting spindle rotatably mounted in said ram for bodily movement therewith, a plurality of angularly disposed rectilinear bearing surfaces formed in said head for slidably supporting said ram, complementary rectilinear bearing surfaces formed on said ram and disposed to slide upon said bearing surfaces in said head in manner to provide for axial movement of said tool spindle relative to said head, retaining means disposed to maintain the bearing surfaces on said ram in close engagement with the bearing surfaces in said head to insure accurate alignment of said spindle at any position assumed by said ram, and clamping means arranged to force the bearing surfaces on said ram into clamping engagement with the bearing surfaces in said head, whereby said ram may be clamped in a predetermined position without changing the alignment of said spindle.

7. In a machine tool, the combination with a frame and a member slidably mounted on said frame, of angularly disposed fixed bearing surfaces formed on said frame, complementary bearing surfaces formed on said slidable member and disposed in engagement with said surfaces on said frame, other bearing surfaces formed on said slidable member and disposed in opposition to said first mentioned surfaces thereon, adjustable gibs carried by said frame and disposed to engage said other bearing surfaces on said slidable member to retain it in contact with said fixed bearing surfaces, and a clamping element carried by said frame and disposed to engage said slidable member at a position opposed to said fixed bearing surfaces, whereby when said clamping element is tightened it will force said slidable member into clamping engagement with said fixed bearing surfaces to clamp it without changing its position.

8. In a boring machine, the combination with a spindle supporting head presenting two fixed bearing surfaces disposed at right angles to each other, a spindle supporting ram presenting bearing surfaces complementary to and disposed to cooperate with the fixed bearing surfaces on said head and presenting other bearing surfaces parallel with and opposed to said first mentioned bearing surfaces, adjustable gibs carried by said supporting head and adapted to engage said other bearing surfaces in manner to support said ram for sliding movement in contact with said fixed bearing surfaces on said head, and a tool supporting spindle rotatably mounted in said ram.

9. In a machine tool having work-supporting means, a tool supporting head mounted for movement relative to said work-supporting means, a ram slidably mounted in said head, a tool spindle rotatably supported by said ram, means to drive said spindle, feeding mechanism for moving said ram including rate changing mechanism carried by said ram and operatively connected to be driven directly from said spindle, reversing and disconnecting mechanism disposed to be driven at selected rate by said rate changing mechanism, and means selectively driven in either direction by said reverser and operative to effect movement of said ram relative to said head.

10. In a boring and milling machine, a work-supporting structure, a tool supporting column disposed adjacent to said work-supporting structure, a tool carrying head slidably mounted for vertical movement on said column, a tool driving spindle rotatably and slidably mounted in said head for rotating and feeding a cutting tool relative to a workpiece on said work-supporting structure, a motor mounted on said head for rotating and feeding said spindle, a transmission train including a speed changer operatively connected to transmit power from said motor to said spindle to rotate it at a selected one of a plurality of speeds, and a spindle feeding transmission train including a feed rate changer and a reverser operatively connected to be driven by said spindle and functioning to feed said spindle longitudinally at a selected one of a plurality of rates.

11. In a machine tool having a bodily movable spindle supporting head, a horizontally disposed spindle supporting ram carried by said head, a horizontal tool supporting spindle rotatably mounted in said ram for axial bodily movement therewith, a plurality of angularly disposed rectilinear bearing surfaces formed in said head for slidably supporting said ram, complementary rectilinear bearing surfaces formed on said ram and disposed to slide upon said bearing surfaces in said head in manner to provide for axial movement of said tool spindle relative to said head, retaining means disposed to maintain the bearing surfaces on said ram in close engagement with the bearing surfaces in said head to insure accurate alignment of said spindle at any position assumed by said ram, and an outwardly extending supporting bracket carried by said head and disposed to engage the lowermost bearing surface on said ram to support it when in retracted position.

12. In a machine tool having work-supporting means, a tool supporting head mounted for movement relative to said work-supporting means, a ram slidably mounted in said head, a tool spindle rotatably supported by said ram, means to drive said spindle, feeding mechanism for moving said ram including reversing mechanism disposed to be driven at selected rate and operative to effect movement of said ram in either direction relative to said head, an irreversible drive mechanism disposed to operatively connect said feeding mechanism to said ram, a manually actuated clutch disposed to selectively connect said feeding mechanism to said irreversible drive mechanism, manually actuated means for turning said irreversible drive mechanism when said clutch is disengaged to effect precise adjustment of said ram, a second clutch arranged to selectively connect said irreversible drive mechanism to drive said ram, manually actuated means disposed to actuate said ram directly for moving it at rapid rate, and means associated with said rapid rate manually actuated means to control said clutch for engaging or disengaging said irreversible drive mechanism.

13. In a machine tool the combination of a plurality of rotatable spindles and a relatively movable support, a plurality of first power operable transmission mechanisms for rotation of said spindles, a second transmission mechanism for power operation of said relative movement at alternative feed or quick traverse rates, a controller shiftable for selection of said alternative feed or quick traverse rates, means normally operable in the feed rate position of said controller to prevent power actuation of said second transmission unless one or more of said first transmissions is power actuated, means normally operable in the quick traverse rate position of said controller to permit power actuation of said second transmission irrespective of the power connection of said first transmission, and means operative to interrupt said second transmission when power to any one of said first transmissions is interrupted by reason of an overload condition therein.

14. In a machine tool having a work-supporting table and a plurality of tool supporting spindles, the combination with a driving motor for said table and an independent driving motor for each of said spindles, of an electrical control system for said motors, including control means functioning to permit operation of said table motor whenever one or more of said spindle motors is operating, and overload trip apparatus arranged to stop said table motor whenever any one of said independent spindle motors becomes overloaded.

15. The combination with a plurality of rotary milling tools and a plurality of electric motors respectively connected for driving each of said milling tools independently, of work feeding mechanism cooperating with said milling tools, an independent electric motor connected to operate said work feeding mechanism, and means controlling said motors whereby said work feeding motor may be started to actuate said work feeding mechanism whenever any one of said tool motors is operating and said work feeding motor is caused to stop whenever any one of said motors is subjected to an overload.

16. In a machine tool having a work moving motor and a plurality of spindle driving motors, an electrical control system for controlling said motors, including interlocking control switches so arranged that said work moving motor is free to drive said work-support at rapid traverse rate regardless of whether or not said spindle motors are operating but is prevented from driving said work-support at feed rate unless at least one of said spindle motors is operating.

17. In a machine tool having a work-supporting table, a plurality of bodily movable tool supporting heads disposed in cooperating relationship with said table, a tool spindle carried by each tool supporting head, a motor for effecting movement of said work table and said heads, transmission mechanism for transmitting power from said motor to said table and to said heads at feed rate or at rapid traverse rate selectively, a motor operatively connected for driving each tool spindle independently, a control system for said motors including means associated with said transmission mechanism and functioning to prevent operation of said table and head moving motor when said transmission mechanism is adjusted to effect movement at feed rate unless at least one of said spindle driving motors is operating, said system functioning to permit operation of said table and head moving motor when said transmission mechanism is adjusted to effect movement at rapid traverse rate regardless of whether or not either of said spindle driving motors is operating, and other control means responsive to overload conditions and operative to stop said table moving motor whenever any one of said spindle driving motors becomes overloaded.

18. In a machine tool having a plurality of tool supporting spindles and a cooperating work-supporting structure, the combination with an individual spindle motor operatively connected to drive each spindle independently and a feed motor operatively connected to effect relative feeding movement between said work supporting structure and said spindles, of a normally closed overload relay associated with each of said motors, a source of electrical energy, a control switch associated with each of said spindle motors and operative to connect it to said source of energy, an interlocking contactor associated with each of said spindle motor switches and arranged to be closed whenever said switch is closed, an electrically operated control switch associated with said feed motor and operative to connect it to said source of energy, and a control circuit for said feed motor leading from said source of energy through all of said overload relays in series circuit relationship and then through all of said interlocking contactors in parallel circuit relationship to said electrically operated control switch, the arrangement being such that said feed motor can be operated only when one or more of said spindle motor switches is closed, and said feed motor will be stopped upon the occurrence of an overload condition in any one of said motors.

19. In a machine tool, a supporting structure presenting a plane bearing surface and an opposed clamping surface, a movable element presenting a bearing surface complementary to and disposed to engage and slide upon the plane bearing surface of said supporting structure, a plurality of pairs of clamping members carried by said movable element and disposed to engage said opposed clamping surface at spaced positions respectively, an equalizing mechanism including a lever engaging at its ends with and arranged to apply clamping pressure equally to each of said pairs of clamping members, and means for dividing the clamping pressure equally between the two clamping members of each pair, whereby equalized clamping pressures may be applied to said clamping surface at spaced positions to force said movable element into clamping engagement with the bearing surface of said supporting structure throughout a large area.

20. In a machine tool, a supporting structure, a spindle carrying ram slidably mounted in said supporting structure, a spindle journalled in said ram, driving means for said spindle including speed changing gearing mounted on said ram and operatively connected to drive said spindle at a selected one of a plurality of speeds, feeding means for said spindle including rate changing gearing mounted on said ram and operatively connected to be driven by said spindle, and means driven by said rate changing gearing and operatively connected to effect sliding movement of said ram at a selected one of a plurality of rates.

21. In a machine tool, a supporting frame, a spindle carrying head movably mounted on said frame, a spindle ram slidably mounted on said head, a spindle rotatably mounted in said ram, means for rotating said spindle including range changing mechanism mounted on said ram and operatively connected to drive said spindle in a selected speed range, a speed changing mechanism mounted on said movable head and operatively connected to drive said range changing mechanism at a selected speed, a source of power connected to drive said speed changing mechanism, means for effecting feeding movement of said spindle including rate changing mechanism mounted on said ram and operatively connected to be driven by said spindle, and means connected to be driven by said rate changing mechanism and operative to effect sliding movement of said ram relative to said head for causing bodily feeding movement of said spindle.

22. In a machine tool, the combination with a plurality of driven members and at least three electric motors operatively connected respectively to drive different of said members, of an electrical control system for controlling said motors, comprising overload protective means operative to deenergize all of said motors upon the occurrence of an overload in any but one of them, and interlocking means operative to prevent energization of said one of said motors unless at least one of the other motors is energized.

23. In a machine tool, a supporting column, a spindle carrying head slidably mounted on said column, a spindle quill slidably mounted in said spindle head, a spindle rotatably journalled in said quill for axial bodily movement therewith relative to said head, and a supporting bracket carried by said head and extending therefrom in position to support said quill when it is projected from said head in moving to its retracted position.

24. In a machine tool, a supporting structure, a spindle carrying head movably mounted on said supporting structure and presenting plane bearing surfaces, a tubular spindle supporting quill, a spindle rotatably journalled in said quill, bearing elements extending outwardly from said tubular quill and presenting plane bearing surfaces complementary to and disposed in sliding engagement with said plane bearing surfaces in said head, and means to retain said plane bearing surfaces in close engagement, whereby said quill is rigidly supported for sliding movement relative to said head along an accurately predetermined line.

25. In a machine tool comprising a supporting member presenting bearing surfaces disposed in angularly related planes, a movable member presenting complementary bearing surfaces disposed to engage and slide upon the bearing surfaces of said supporting member, adjustable means disposed to retain said movable member in engagement with the bearing surfaces of said supporting member, and clamping means arranged to exert force upon said movable member in direction toward said bearing surfaces of said supporting member and within the angle formed by the planes thereof, whereby the bearing surfaces of said movable member may be forced into clamping engagement with said angularly related bearing surfaces of said supporting member to retain said movable member firmly in predetermined position.

26. In a machine tool having a plurality of tool carrying spindles and a cooperating work-supporting structure, the combination with a plurality of individual spindle motors each operatively connected to drive one of said spindles independently, and a feed motor operatively connected to effect relative feeding movement between said work-supporting structure and said spindles, of an electrical control circuit for said feed motor including an interlocking contactor associated with each of said spindle motors said contactors being connected in said control circuit in parallel circuit relationship in manner to permit operation of said feed motor whenever any one or more of said spindle motors is running, and an overload relay associated with each of said spindle motors said relays being connected in said control circuit in series circuit relationship in manner to effect deenergization of said feed motor whenever any one of said spindle motors becomes overloaded.

27. In a machine tool having a work-supporting structure and a plurality of tool supporting spindles, the combination with transmission mechanism arranged to effect relative feeding movement between said work-supporting structure and said tool supporting spindles, a feed motor operatively connected to drive said transmission mechanism, and a plurality of spindle motors operatively connected respectively to drive said spindles individually, of an overload relay and a motor controlling switch including an interlocking contactor associated with each of said spindle motors, and an energizing circuit for said feed motor extending through said interlocking contactors in parallel circuit relationship and through said overload relays in series circuit relationship, whereby said feed motor may be operated whenever any one of said spindle motors is operating and the corresponding interlocking contactor is closed and said feed motor will be stopped whenever any one of said spindle motors becomes overloaded and the corresponding overload relay opens.

28. In a machine tool having a plurality of tool supporting spindles, an individual spindle motor operatively connected to drive each spindle independently, a work-supporting structure, a feed motor operatively connected to effect relative feeding movement between said work-supporting structure and said spindles, an interlocking contactor and an overload relay associated with each spindle motor, both the contactor and the relay being closed when the corresponding motor is operating, said contactors being electrically connected in parallel circuit relationship and said overload relays being electrically connected in series circuit relationship, and an energizing circuit for said feed motor including in series relationship said parallelly connected contactors and said serially connected relays, whereby said feed motor may be operated whenever any one of said spindle motors is operating and said feed motor will be stopped whenever any one of said spindle motors becomes overloaded.

29. In a machine tool having a rotatable tool spindle and a work-support mounted in cooperating relation therewith for movement relative thereto, the combination with a motor operatively connected to drive said spindle, another motor for driving said work-support, and a transmission mechanism operatively connecting said work-support motor to said work-support, said mechanism being adjustable in manner to move said work-support selectively at either feed rate or rapid traverse rate; of control mechanism for said motors including means operative to stop said work-support motor upon the occurrence of an overload condition in either of said motors when said transmission mechanism is adjusted to operate at feed rate, and means operative to effect energization of said work-support motor independently of said spindle motor when said transmission mechanism is adjusted to effect operation of said work-support at rapid traverse rate.

30. In a machine tool, a supporting structure, a spindle carrying ram slidably supported by said structure, a spindle journalled in said ram, driving means operatively connected to drive said spindle, feeding means for said spindle including rate changing mechanism carried by said ram and operatively connected to be driven by said spindle, and means driven by said rate changing mechanism and operative to cause sliding movement of said ram for effecting axial feeding movement of said spindle at a selected rate.

JOSEPH B. ARMITAGE.
ORRIN W. BARKER.